United States Patent [19]

Stroub

[11] 4,137,010

[45] Jan. 30, 1979

[54] CONSTANT LIFT ROTOR FOR A HEAVIER THAN AIR CRAFT

[75] Inventor: Robert H. Stroub, San Jose, Calif.

[73] Assignee: The United States of America as represented by the Administrator of the National Aeronautics and Space Administration, Washington, D.C.

[21] Appl. No.: 818,916

[22] Filed: Jul. 25, 1977

[51] Int. Cl.² .................................... B64C 27/72
[52] U.S. Cl. .................................... 416/51; 416/88; 416/89; 416/132 R; 416/138
[58] Field of Search ................. 416/51, 88, 89, 131 A, 416/132 R, 138 A, 140 A

[56] References Cited

U.S. PATENT DOCUMENTS

| 1,757,667 | 5/1930 | Hesse | 416/89 |
| 2,108,245 | 2/1938 | Ash | 416/88 |
| 2,520,268 | 8/1950 | Avery | 416/132 |
| 2,776,017 | 1/1957 | Alexander | 416/89 X |
| 2,950,768 | 8/1960 | Wagner | 416/140 A X |
| 3,215,370 | 11/1965 | Strydom | 416/51 X |
| 3,227,220 | 1/1966 | You | 416/134 A |
| 3,227,221 | 1/1966 | You | 416/132 X |
| 3,297,094 | 1/1967 | Kisovec | 416/89 |

FOREIGN PATENT DOCUMENTS 606784  8/1948  United Kingdom ................ 416/88

Primary Examiner—Everette A. Powell, Jr.
Attorney, Agent, or Firm—Darrell G. Brekke; John R. Manning; Armand McMillan

[57] ABSTRACT

A rotor blade extended radially from a hub, characterized by an elongated spar and a plurality of axially aligned shells pivotally mounted on the spar, each having an aerodynamic center located in trailing relation with the spar and supported thereby for simultaneous axial and angular displacement as centrifugal forces are applied thereto, and a pitch controller including a plurality of pivotal pitch limiting arms transversely related to the spar, each being characterized by a cam surface defined along one edge thereof, engaging in supporting relation a cam follower of a truck pivotally connected to a shell and supported thereby for pivotal motion about an axis coincident with a radius of said spar, and a push-pull link interconnecting the arms for imparting simultaneous pivotal motion thereto, whereby the angular relationship of the arms to the spar is varied for varying the motion of the trucks along the arms for thus limiting the pitch of the segments about the spar.

10 Claims, 5 Drawing Figures

CONSTANT LIFT ROTOR FOR A HEAVIER THAN AIR CRAFT

ORIGIN OF THE INVENTION

The invention described herein was made by an employee of the U.S. Government and may be manufactured and used by or for the government for governmental purposes without the payment of any royalties thereon or therefor.

BACKGROUND OF THE INVENTION

1. Field of the Invention

The invention generally relates to rotors for heavier than air craft, and more particularly to an improved rotor blade capable of simultaneously utilizing components of lift and centrifugal forces for establishing a desired pitch angle for the blade.

2. Description of the Prior Art

Rotors for helicopters and the like are often equipped with pitch control mechanisms which serve to dictate the instantaneous pitch angle for the rotor blades, for thus establishing a desired coefficient of lift.

One technique for achieving pitch control is embodied in the concept of providing each rotor blade with a flap or aileron located at its trailing edge, the angular position of which may be cyclically adjusted for varying the pitch of the blade. Such a system is described in U.S. Pat. No. 2,443,393.

Another system heretofore suggested for use in achieving pitch control includes a pair of fly-ball weights upon which centrifugal force is exerted for actuating pitch control linkages which vary the pitch angles for the blades. Such a system is disclosed in U.S. Pat. No. 2,614,637.

Systems referred to as the Girvaions-Dorand system which includes pressure sensing devices, for sensing changes in pressure on rotor blades, connected with signal processing circuits which serve to transmit error signals to trailing edge flaps, also have been suggested for initiating changes in effective pitch angles for rotor blades.

Finally, it has been suggested that pivotal trailing edge flaps controlled by cam-actuated linkages, responsive to centrifugal forces, can be employed in controlling the pitch angles for rotor blades. For example, such is disclosed in U.S. Pat. No. 3,215,370.

Unfortunately, generally speaking, while the systems previously mentioned function satisfactorily for their intended purposes, it should be appreciated that each of the systems of the prior art fails to totally satisfy existing needs. For example, where fly-balls are used in controlling the pitch of a pitchable blade, weight and complexity factors tend to impair performance, where pressure sensors are employed complexity is increased, and, in any event, where trailing edge flaps are provided for a blade, maximum lift capabilities are sacrificed in establishing the negative flap deflection required for increasing the angle of attack for the blade.

Accordingly, it can be appreciated that among the disadvantages of the systems of the prior art are those which may be classified generally as follows: complexity in structure; reduction in lift capability; excessive costs in terms of economics; redundancy; and lack of reliability.

It is therefore the general purpose of the instant invention to provide a simplified, economic, highly reliable, variable pitch rotor blade for use in rotors for heavier than air craft which overcomes the aforementioned disadvantages and inadequacies of rotor blades previously suggested and employed.

OBJECTS AND SUMMARY OF THE INVENTION

It is an object of the instant invention to provide an improved rotor blade for a heavier than air craft.

It is another object to provide in a constant lift rotor an improved rotor blade the pitch of which is controlled in response to applied components of centrifugal force.

It is another object to provide in a constant lift rotor an improved rotor blade the pitch of which is dictated by the magnitude of centrifugal force applied thereto as the blade is driven in rotation.

It is another object to provide an improved airfoil supported for angular displacement and having an instantaneous pitch attitude determined by the magnitude of lift developed and the magnitude of applied components of centrifugal force acting in opposition to lift.

It is another object to provide in a constant lift rotor an improved rotor blade which responds to lift for establishing a pitch moment about the axis of the blade and a controller which responds to centrifugal force for providing a pitch control moment acting in opposition to the pitch moment for limiting lift induced pitch.

It is another object to provide in a blade for a rotor for a heavier than air craft an airfoil including a plurality of aerodynamic shells arranged in spanwise alignment and abaxially related to the spar of the blade supported for simultaneous axial and angular displacement relative to the axis of the blade, and a pitch controller for varying the pitch angle of the airfoil as the spar is driven in angular displacement about the axis of the rotor.

It is another object to provide in a rotor for heavier than air craft an improved blade supported for axial displacement in response to applied centrifugal force and angular displacement in response to applied lift, comprising a plurality of aerodynamically configured shells arranged in spanwise alignment and abaxially related to the axis of the spar of the blade and supported thereby for simultaneous axial and angular displacement, and the push-pull linkage connected with each of the shells for simultaneously limiting both axial and angular displacement of the shells as the spar is advanced in angular displacement about a circular path concentrically related to the hub of the rotor.

These and other objects and advantages are achieved through the use of a rotor blade supported for angular displacement along a circular path, an elongated airfoil supported by a spanwise spar comprising a plurality of axially aligned shells of similar aerodynamic configurations, each being characterized by an aerodynamic center located in trailing relation with the spar, as the spar is advanced along a circular path, a sleeve supporting each of the shells for lift induced angular displacement about the spar, whereby a pitch moment is established for each of the shells, and for axial displacement along the spar, as the centrifugal force is applied thereto, and a pitch controller responsive to axial displacement of the shells for establishing a pitch control moment acting in opposition to pitch moments for each of the shells, as will become more readily apparent in view of the following description and claims in light of the accompanying drawings.

IN THE DRAWINGS

DETAILED DESCRIPTION OF THE PREFERRED EMBODIMENT

Figure 1:
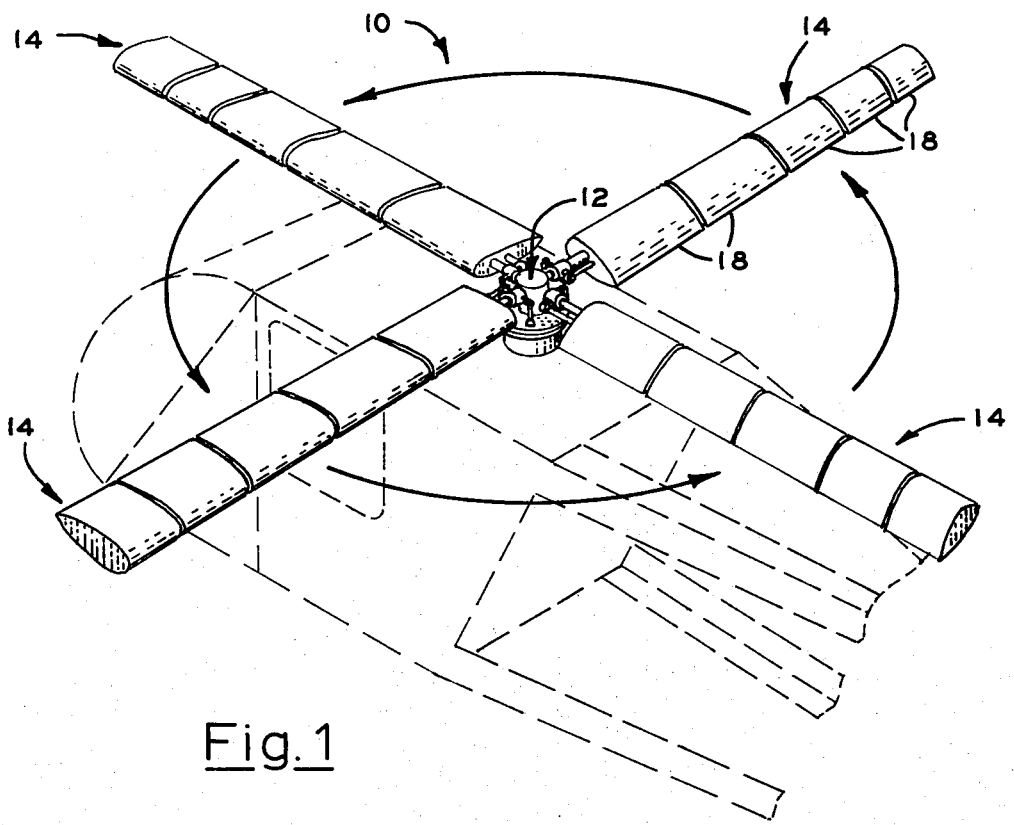
FIG. 1 is a perspective environmental view of a constant lift rotor including a plurality of segmented blades embodying the principles of the instant invention.

Referring now with more particularity to the drawings, wherein like reference characters designate like or corresponding parts throughout the several views, there is shown in FIG. 1 an improved rotor 10. The rotor 10 includes a hub 12 from which is extended a plurality of rotor blades 14 comprising airfoils which embody the principles of the instant invention.

It will, of course, be appreciated that all of the blades 14 are of a common design and function as airfoils for providing lift as they are driven in rotation about the hub 12. Therefore, a detailed description of a single blade 14 is believed to be adequate for providing a complete understanding of the invention.

Figure 2:
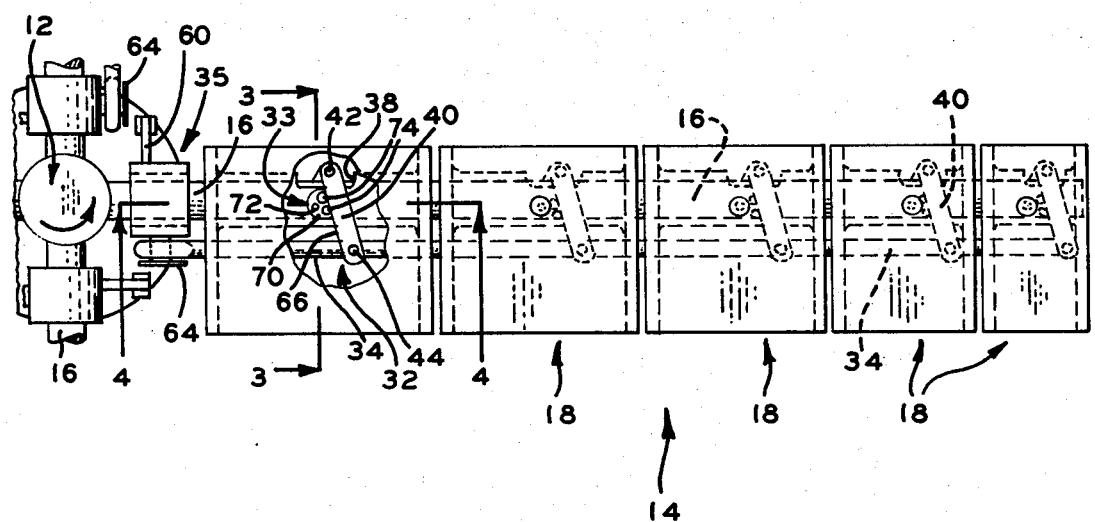
FIG. 2 is a fragmented, top-plan view of one of the rotor blades shown in FIG. 1, illustrating an operational relationship established between the segments of the blade and a pitch controller provided therefor.

Turning for a moment to FIG. 2, it can be seen that the rotor blade 14, as therein illustrated, is projected from and supported by the hub 12; however, the hub 12 is deemed to be of suitable design and forms no specific part of the instant invention. Likewise, the particular drive train employed for imparting rotary motion to the hub 12 is deemed to be of suitable design and forms no specific part of the instant invention. However, it will be appreciated that as the hub 12 is driven in rotation, each of the blades 14 is caused to progress about a circular path concentrically related to the hub 12. Moreover, it is to be understood that as the blades 14 are caused to advance about a circular path circumscribing the rotor hub 12, each is subjected to centrifugal force. It is the principle component of this force which is utilized in establishing pitch control moments for the blades 14.

Each blade 14, as shown, includes a spar 16 extended the length thereof, and a plurality of blade segments, each being designated by the reference numeral 18, supported by the spar for both angular and axial displacement relative thereto. Of course, the number of segments is varied as desired. For example, where so desired, a blade may include only a single segment. However, as herein described, each of the blades 14 comprises a suitable number of segments arranged in spanwise alignment.

Each of the segments 18 is provided with a tubular sleeve 20 concentrically related to the spar 16 and supported thereby for axial movement therealong, as well as for angular displacement thereabout, the purposes of which will hereinafter become more readily apparent. The mating surfaces of the shell 22 and the spar 16 preferably comprise bearing surfaces for facilitating relative movement therebetween.

Mounted on each of the sleeves 20 is a shell 22 of an aerodynamic configuration forming an airfoil having a leading edge designated 24 and a trailing edge designated 26. Of course, the particular material from which the shell 22 is formed is deemed to be a matter of convenience only. It is to be understood, however, that each of the shells 22 is fabricated from materials sufficient to withstand the forces to which the blade is subjected.

Each sleeve 20 includes end plates, not designated, which receive a shell 22 in a circumscribing relationship therewith. It is important to note, however, that the shell 22 is so configured as to position its aerodynamic center in trailing relation with the spar 16, FIG. 3. Thus the shell 22 is subjected to lifting forces, hereinafter simply referred to as lift, within a zone represented by a point designated AC, located in spaced trailing relation with the spar 16.

While the shell 22 may be secured to the sleeve 20 in any suitable manner, it is preferred that the shell also be provided with a pair of axially spaced end plates 28 joined to the end plates of the sleeve through a use of rivets 30. Hence, it should be appreciated that since each of the sleeves is supported for both axial and angular displacement relative to the spar 16, each of the segments 18 comprises an integrated body supported for axial displacement along the spar 16 as well as angular displacement about the spar.

Figure 3:
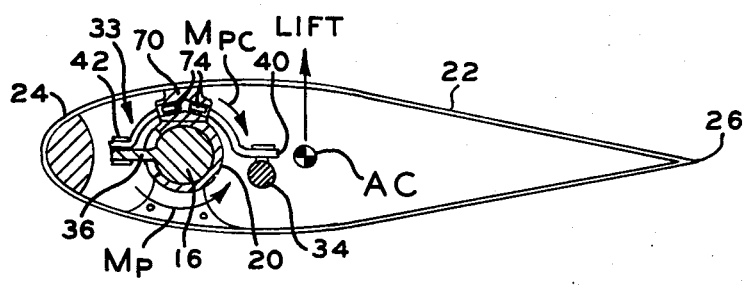
FIG. 3 is a cross-sectional view taken generally along lines 3—3 of FIG. 2.
Figure 5:
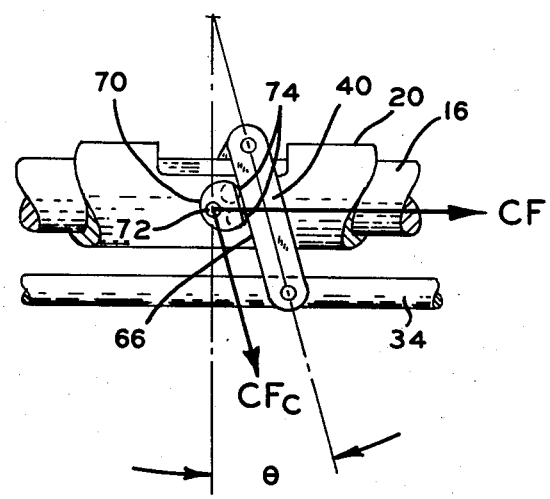
FIG. 5 is a diagrammatic view illustrating an operation of the pitch control system included within the blades shown in FIGS. 1 through 4.

In view of the foregoing, it should be appreciated that as the spar 16 is caused to progress about a circular path, each of the segments 18 inherently is subjected to both centrifugal force, identified by arrow CF, FIG. 5., and lift, as identified as a force arrow LIFT, FIG. 3. The centrifugal force, of course, causes the segments to move outwardly toward the distal end of the spar 16. Lift applied at the aerodynamic center AC establishes a pitch moment, identified by arrow $M_p$, acting about the axis of symmetry of the spar 16, FIG. 3. If the pitch moment $M_p$ is unopposed, the angle of attack will be reduced with an attendant loss of lift, until a stabilized condition is established. When such a condition is established, lift becomes a substantially ineffective force acting on the blade segment 18.

In order to oppose the pitch moment $M_p$, the rotor blade 14 is provided with a pitch controller, generally designated 32, the purpose of which is to establish about the spar 16 a pitch control moment $M_{pc}$. The pitch controller 32 includes a plurality of interconnected motion limiters, generally designated 33, and a push-pull linkage including a link 34 connected to an actuator 35 disposed in close proximity with the inboard end of the spar 16.

Since the motion limiters 33 are of a similar design and function in a similar manner to achieve similar results, a detailed description of a single one of the motion limiters 33 is believed sufficient to provide for a complete understanding of the instant invention.

Figure 4:
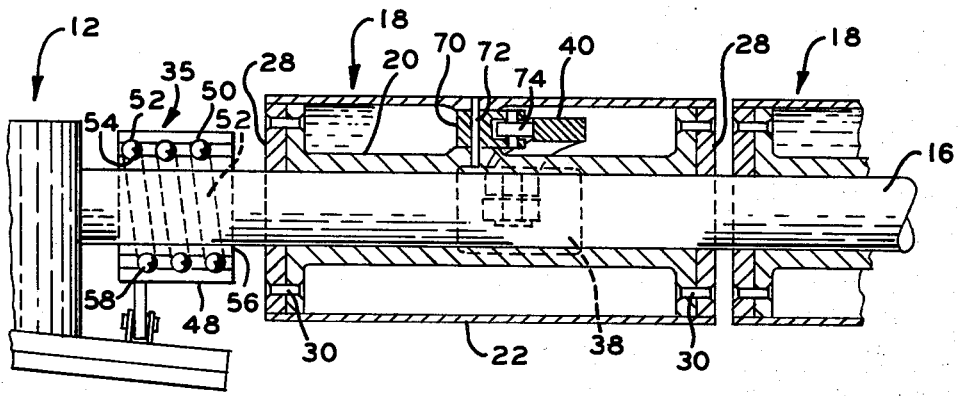
FIG. 4 is a cross-sectional view taken generally along lines 4—4 of FIG. 2.

Referring for a moment to FIGS. 3 and 4, is can be seen that each motion limiter 33 includes an anchor bracket 36 welded or otherwise rigidly secured to the leading edge of the spar 16. This bracket projects through a suitable opening 38 formed in the sleeve 20. To the bracket 36, there is pivotally connected a motion limiter arm 40. The particular manner in which the motion limiter arm 40 is connected with the bracket 36 is varied as desired; however, as shown, a suitable wrist pin coupling 42 is provided for this purpose.

The wrist pin coupling 42 serves to accommodate pivotal motion of the limiter arm 40 about an arc intersected by the axis of the spar 16. Hence, the angular relationship of the arm 40 relative to the longitudinal axis of symmetry for the spar 16 is, in operation, varied. The purpose for such variation in the angular relationship of the arm and spar is to limit the pitch of the segment 18 associated therewith, as will hereinafter become more readily apparent.

In order to effect pivotal displacement of the arm 40, the link 34 is connected through a suitable pivotal coupling 44 to the extended end of the motion limiter arm 40. Consequently, simply by imparting rectilinear motion to the link 34, the angular relationship of the motion limiter arm 40 to the longitudinal axis of symmetry for the spar 16 is varied.

Rectilinear motion is imparted to the link 34 through the actuator 35, best shown in FIG. 4. The actuator 35 includes a barrel 48 having defined therein a ball-screw 50 the purpose of which is to couple the barrel 48 with the spar 16. The ball-screw 50 is of known design and, as shown, includes a helical groove 52 formed on the internal surface of the barrel 48 and a helical groove 54 formed on the external surface of a sleeve, designated 56, rigidly affixed to the spar 16. The grooves 52 and 54 comprise mirror images, each of the other, and receive therein a plurality of balls 58 which assure free rotation of the barrel 48. As the barrel is rotated, axial displacement along the spar 16 is imparted thereto.

In order to impart angular displacement to the barrel 48, a horn 60 is projected radially from the barrel 48 and connected with a swash plate 62 in a suitable manner. Since the swash plate 62 forms no specific part of the instant invention, a detailed description thereof is omitted in the interest of brevity. However, it is to be understood that the swash plate is operatively employed for imparting angular displacement to the barrel 48 of the actuator 35.

Axial displacement of the barrel 48 of the actuator 35 is transmitted to the link 34 via a trunnion 64 projected radially from the barrel and employed to couple the inboard end of the link to the barrel. Consequently, angular displacement imparted to the barrel 48, in response to an operation of the swash plate, serves to advance the barrel axially relative to the longitudinal axis of the spar 16. The axial displacement of the barrel is, in turn, imparted to the link 34. As axial motion is imparted to the link 34, pivotal motion is imparted to the interconnected motion limiter arms 40, simultaneously.

It is important to note that extended along one edge of each motion limiter arm 40, there is a linear cam surface 66 upon which is seated a cam follower comprising a truck 70. The truck 70 is pivotally connected to its respective shell 22 by a pivot pin 72, FIG. 4, having an axis coincident with a projected radial of the spar 16. As shown, each of the trucks 70 includes bearings 74 seated on a cam surface 66. However, where desired, a plan bearing surface can be employed for supporting the truck 70 in cam-following engagement with the cam surface 66.

As illustrated in FIG. 5, the longitudinal axis of the arm 40, which parallels the cam surface 66, and a reference line normally related to the longitudinal axis of the spar 16 collectively define an included angle $\theta$. Of course, the position assumed by the link 34 determines the angle $\theta$.

Centrifugal force, designated by the arrow identified CF, acting on the truck 70, includes a force component, designated by the arrow $CF_c$, paralleling the longitudinal axis of the arm 40. Thus the moment $M_{pc}$ is established about the spar 16 according to the equation $M_{pc}$ = r CF sin $\theta$, where r = the radial distance between the center line of the spar 16 and the truck 70, CF = centrifugal force and sin $\theta$ = the sine of the angle established between the axis of the arm 40 and the reference line normally related to the axis of the spar. It is to be understood that the moment $M_{pc}$ is independent of the truck's position along the arm 40 and comprises a pitch control moment acting in opposition to the pitch moment $M_p$. Hence, as the blades 14 are advanced along a circular path, the pitch attitude for the segments 18 thereof is established as equilibrium is established between the opposed moments $M_p$ and $M_{pc}$.

Modulation of the lift for the segments 18 of each of the blades 14 is achieved simply by modulating the pitch control moment $M_{pc}$ by imparting rectilinear motion to the link 34.

While the truck 70 as herein illustrated and described is pivotally connected to the shell 22, it is to be understood that where so desired, the truck 70 is supported for motion independently of the shell 22 and connected with the shell through a pin-and-groove or ball-and-groove coupling, not shown. In such instances, the shells remain stationary, in axial directions, relative to the spar 16, while the trucks are afforded a freedom of movement independently of the shell.

OPERATION

It is believed that in view of the foregoing description, the operation of the device will readily be understood and it will be briefly reviewed at this point.

With the rotor 10 assembled in the manner hereinbefore described, rotary motion imparted to the hub 12 is transmitted to each of the blades 14 via the spars 16. As the spars 16 are caused to tranverse a circular path, each of the blades is subjected to centrifugal force. Such force causes the sleeves 20 to slidingly advance outwardly from the inboard end of the spars toward the distal ends thereof. Simultaneously, the segments 18 are subjected to lift resulting in pitch moments $M_p$ being established about the spars 16. The pitch moments $M_p$, in turn, are opposed by pitch control moments $M_{pc}$. The moments $M_{pc}$ result from centrifugal force components $CF_c$ acting on the trucks 70 in a direction for causing the trucks to advance along the cam surfaces 66 of the arms 40 about the axis of the spar 16 for thus establishing moments $M_{pc}$.

The magnitude of the moments $M_{pc}$ is determined by the angles $\theta$ defined between the longitudinal axes of the arms 40 and a reference line orthogonally related to the longitudinal axis of the spar 16. In order to alter the magnitude of the pitch control moments $M_{pc}$, and thus vary the pitch angle of the blades 14, angular displacement is imparted to the barrels 48 of the actuators 35 for thus forcing the links 34 to move generally in linear directions. By imparting linear motion to these links, the angles $\theta$ are varied. Since increases in the angles $\theta$ result in a decrease of the forces acting on the trucks 70 in opposition to the forces CF, the segments 18 advance axially with an attendant angular motion whereupon the segments are caused to rotate about the spar 16 in a direction for increasing the angle of attack. Increased angle of attack results in increased lift. Simply by fixing the position of the arm 40 relative to the spar 16, the angle of attack for the segments 18 is stabilized.

In view of the foregoing, it is believed to be readily apparent that the individual segments collectively comprise an improved airfoil the instantaneous pitch attitude of which is determined by the magnitude of lift developed and the magnitude of components of applied centrifugal force acting in opposition to lift as the blades are caused to advance along a circular path concentrically related to the rotor hub.

Although the invention has been herein shown and described in what is conceived to be the most practical and preferred embodiment, it is recognized that departures may be made therefrom within the scope of the invention, which is not to be limited to the illustrative details disclosed.

What is claimed:

1. In a constant lift rotor, the improvement comprising:
   A. a spar for an airfoil radially extended from a rotor hub adapted to drive the spar in angular displacement along a concentrically related path;
   B. an elongated airfoil mounted on said spar and supported thereby for pitch displacement about the longitudinal axis thereof, said airfoil having an aerodynamic center spaced in trailing relation with said spar, said angular displacement of said spar and said airfoil causing a lift force on said airfoil and a pitch moment about said spar axis;
   C. a motion limiting arm pivotally coupled to said spar and having a camming surface extended along one edge extended along one edge thereof;
   D. a movable cam follower truck connected to said airfoil, said truck being seated on said camming surface and movable therealong in response to centrifugal forces for establishing a pitch moment acting in opposition to said pitch moment; and
   E. means coupled to said motion limiting arm for modulating said pitch control moment.

2. The improvement of claim 1 wherein the airfoil includes an aerodynamic shell abaxially related to said spar and supported for axial displacement therealong as the spar is advanced along said path.

3. The improvement of claim 2 wherein said shell comprises one of a plurality of similarly configured shells abaxially related to said spar.

4. The improvement of claim 2 wherein said modulating means comprises a control linkage connected to said motion limiter arm for varying the angular relationship between said arm and said spar.

5. The improvement of claim 4 wherein said arm is connected to the spar through a wrist pin coupling, and the control linkage includes a rod supported for reciprocation in spaced parallelism with said spar and pivotally connected to the arm in spaced relation with the wrist pin coupling, and drive means for imparting reciprocating motion to said shaft.

6. In a constant lift rotor, the improvement comprising:
   A. a spar for an airfoil radially extended from a rotor hub adapted to drive the spar in angular displacement along a concentrically related path;
   B. an elongated airfoil mounted on said spar and supported thereby for pitch displacement about the longitudinal axis thereof; and
   C. controller means responsive to centrifugal force acting thereon for generating a pitch control moment as the spar is driven in angular displacement;
   D. said airfoil comprising a plurality of aerodynamically configured shells abaxially related to said spar and supported thereby for simultaneous axial and angular displacement relative thereto, each of said shells being configured to have an aerodynamic center spaced in trailing relation with said spar, whereby lift establishes a pitch moment for the shell acting about the spar axis and centrifugal force urges the shell along the spar as the spar is angularly displaced along said path;
   E. said controller means including a truck pivotally connected to each of said shells and movable therewith, and a pivotal arm for each truck, each arm being pivotally mounted on the spar in engaging relation with said truck for urging the truck to advance angularly about the spar as a component of centrifugal force is applied thereto for establishing a pitch control moment for each of said shells acting in opposition to said pitch moment established therefor; and
   F. means coupled to said pivotal arms for modulating said pitch control moments.

7. An improved rotor blade comprising:
   A. an elongated spar supported for angular displacement about a rotor hub;
   B. a plurality of aerodynamically configured shells abaxially related to said spar and supported thereby for simultaneous axial and angular displacement relative thereto, each of said shells being configured to have an aerodynamic center spaced in trailing relation with said spar, whereby lift establishes a pitch moment for the shell along the spar as the spar is angularly displaced;
   C. means within each shell responsive to centrifugal force acting thereon for generating a pitch control moment on said shell acting in opposition to said pitch moment; and
   D. means coupled to said pitch control moment generating means for simultaneously modulating the pitch control moment of each shell.

8. A constant lift rotor for a heavier than air craft comprising:
   A. a rotor hub supported for driven rotation about a lift axis; and
   B. a plurality of rotor blades extended radially from said hub and connected in driven relation therewith; each of said blades including,
      (1) an elongated spar radially connected at its inboard end to said hub and supported thereby for angular displacement along a circular path concentrically related to the lift axis,
      (2) an elongated airfoil supported by the spar comprising a plurality of axially aligned shells of similar aerodynamic configurations, each of said shells being characterized by an aerodynamic center located in trailing relation with the spar as the spar is advanced along said path,
      (3) means supporting each of said shells for axial displacement along said spar as centrifugal force is applied thereto and for angular displacement about said spar, as lift is applied thereto, and
      (4) means including a plurality of motion limiter arms each being of an arcuate configuration and transversely related to said spar having an end pivotally connected to the spar and characterized by a cam surface defined along an edge surface thereof, a truck pivotally connected to each of said shells and supported thereby for pivotal displacement about an axis coincident with a radial of said spar and supported for axial and angular displacment imparted thereto in response to centrifugal force applied to the blades, bearing means mounted on said truck and disposed in frictional engagement with a cam surface defined along the edge surface of one of said arms for facilitating relative motion therebetween, and an axially movable link connected with each of said arms for imparting simultaneous pivotal motion to said plurality of motion limiter arms for varying the angular relationship of said arms relative to said spar for thus varying the magnitude of the relative motion between the bearing means and the cam surface as centrifugal force is applied to the blades, and actuator means for imparting axial motion to said link.

9. The rotor of claim 8 wherein said means for imparting motion to the link includes a barrel concentrically related to said spar near its inboard end characterized by a ball-screw interface for imparting axial displacement of the barrel as rotary motion is imparted thereto, means including a pitch horn radially projected from the barrel for imparting rotary motion thereto, and pivotal means interconnecting said link with said barrel.

10. The rotor of claim 9 wherein pivotal motion imparted to each of said arms establishes an included angle between the longitudinal axis of the arm and the longitudinal axis of the spar and the centrifugal force acting on said truck is characterized by a force component acting in parallelism with the cam surface for establishing a moment equal to the product of the distance between the arm and the axis of the spar, the centrifugal force, and the sine of the included angle.

* * * * *